Patented Oct. 3, 1933

1,928,733

UNITED STATES PATENT OFFICE 1,928,733

PROCESS FOR MANUFACTURING ORTHO-ARYLCARBOXYAMIDOTHIOGLYCOLLIC ACIDS

Jens Müller, Hanau-on-the-Main, Wilhelm Luce, Höchst-on-the-Main, and Fritz Schulte, Frankfort-on-the-Main, Germany, assignors to General Aniline Works Inc., New York, N. Y., a corporation of Delaware No Drawing. Application April 23, 1929, Serial No. 357,602, and in Germany April 28, 1928

5 Claims. (Cl. 260—108)

Our present invention relates to a process of preparing ortho-arylcarboxyamido-thioglycollic acids.

In U. S. Patents Nos. 1,703,145 and 1,725,080, a process for manufacturing certain ortho-arylcarboxyamide-thioglycollic acids is described. This process consists in treating the corresponding ortho-cyanarylthioglycollic acids with acid saponifying agents.

Our present invention relates to a special embodiment of the aforesaid process, more particularly it relates to a process which comprises treating ortho-cyanarylthioglycollic acids of the general formula:

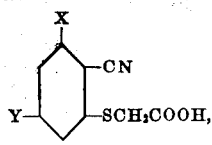

wherein X means hydrogen or an alklygroup and Y means an alkoxygroup or halogen, with aromatic sulfonic acids as saponifying agents.

Especially suitable are sulfonation mixtures of naphthalene or of phenols containing some quantities of free sulfuric acid which are usually obtainable by the technical manufacture of naphthalene- or phenolsulfonic acids.

When using aromatic sulfonic acids as saponifying agents the ortho-carboxyamidoarylthioglycollic acids are obtained with a good yield in a very smooth reaction, practically without the formation of byproducts, even if starting from such ortho-cyanarylthioglycollic acids which contain an alkoxy group or a naphthalene nucleus and which would be partly sulfonated when using for instance sulfuric acid as saponifying agent.

In order to further illustrate our invention the following examples are given, the parts being by weight and all temperatures in centigrade degrees. But we wish it to be understood that we are not limited to the particular conditions nor specific products mentioned therein.

Example 1

52 parts of concentrated sulfuric acid are mixed with 13 parts of crude xylene. The mixture is heated to about 115° while well stirring and maintained for a short time at this temperature. Into the solution thus obtained 20 parts of 2-cyan-1-methyl-5-chlorobenzene-3-thioglycollic acid are slowly introduced at about 80°. The solution thus obtained is maintained at about 85° for about an hour, then the mass is poured on ice. The 1-methyl-5-chlorobenzene-2-carboxyamido-3-thioglycollic acid thus formed separates and may be isolated by filtration and washing with water, whereas the xylene-sulfonic acid remains dissolved in water. The reaction product is identical with that disclosed in U. S. Patent 1,703,145.

Example 2

At about 40° 300 parts of sulfuric acid monohydrate are allowed to act on 200 parts of phenol and into the reaction mixture 150 parts of 4-methoxy-1-cyanbenzene-2-thioglycollic acid are introduced. After stirring for some time on the water bath a clear solution is obtained turning slowly to an olive-green tint whereas the original color is violet. After about two hour's stirring on the water bath the mixture is poured on about 2500 parts of water. The 4-methoxy-1-carboxyamidobenzene-2-thioglycollic acid separates in an almost theoretical yield. It is isolated as described above. The product is identical with that described in Example 3 of U. S. Patent 1,725,080.

Example 3

Into 10 parts of para-toluenesulfonic acid previously well dried on the water bath at about 120–130° 5 parts of 4-ethoxy-1-cyanbenzene-2-thioglycollic acid are introduced. The temperature of the mass is slowly increased to about 130–140° and the mass is maintained at this temperature for some time. After cooling down to about 80° it is diluted and the 4-ethoxy-1-carboxyamidobenzene-2-thioglycollic acid thus formed with a good yield is filtered off. It is identical with the product described in Example 1 of U. S. Patent 1,725,080.

Example 4

300 parts of concentrated sulfuric acid are allowed to run at about 90–100° while stirring into 300 parts of molten naphthalene. Then the temperature is increased and the mass is heated at about 120° for some hours. Into this sulfonation mass at about 80–90° slowly 200 parts of 1-cyan-4-ethoxybenzene-2-thioglycollic acid are introduced and the mass is maintained for some hours at this temperature. Then it is poured on about 2500 parts of water and the formed 4-ethoxy-1-carboxyamidobenzene-2-thioglycollic acid is filtered off and washed with water. It may be purified by redissolving it in a solution of carbonate of soda and precipitating the filtered solution by means of hydrochloric acid. It is identical with the product of Example 1 of U. S. Patent 1,725,080.

When slowly introducing 200 parts of 4-ethoxy-1-cyanbenzene-2-thioglycollic acid at about 80–90° into 300 parts of molten benzylnaphthalene sulfonic acid and keeping the mass for some hours at this temperature the same carboxyamido-compound is formed, which is isolated as described above.

If into the aforesaid sulfonation mass of naphthalene 110 parts of phenol are introduced and the mass is stirred for some hours at about 100° a mixture of naphthalene and phenol sulfonic acids is obtained which may be likewise used for the saponification of the 4-ethoxy-1-cyanbenzene-2-thioglycollic acid thus yielding the same 1-carboxyamido-compound.

We claim:—

1. A process of preparing ortho-arylcarboxyamido-thioglycollic acids which comprises heating ortho-cyanarylthioglycollic acids of the general formula:

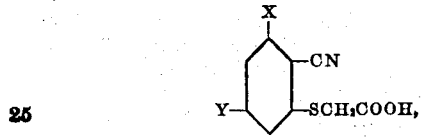

wherein X means hydrogen or an alkylgroup and Y means an alkoxygroup or halogen with an aromatic sulfonic acid.

2. A process of preparing 4-alkoxy-1-carboxyamidobenzene-2-thioglycollic acid which comprises heating ortho-cyanarylthioglycollic acids of the general formula:

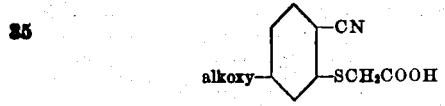

with an aromatic sulfonic acid.

3. A process of preparing 4-alkoxy-1-carboxylamidobenzene-2-thioglycollic acid which comprises heating ortho-cyanarylthioglycollic acids of the general formula:

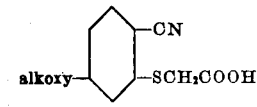

with a mixture consisting essentially of an aromatic sulfonic acid and of a minor quantity of free sulfuric acid.

4. A process of preparing 4-alkoxy-1-carboxylamidobenzene-2-thioglycollic acid which comprises heating ortho-cyanarylthioglycollic acids of the general formula:

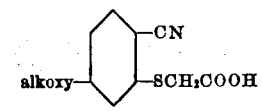

with a mixture consisting essentially of an aromatic sulfonic acid of the benzene or naphthalene series and of a minor quantity of free sulfuric acid.

5. A process of preparing 4-ethoxy-1-carboxyamidobenzene-2-thioglycollic acid which comprises heating 4-ethoxy-1-cyanbenzene-2-thioglycollic acid with a sulfonation mixture of naphthalene consisting of naphthalene-1-sulfonic acid and of a minor quantity of free sulfuric acid.

JENS MÜLLER.
WILHELM LUCE.
FRITZ SCHULTE.